June 27, 1933.  W. C. HEDGCOCK  1,916,151
TRUCK
Filed Oct. 5, 1931  5 Sheets-Sheet 1
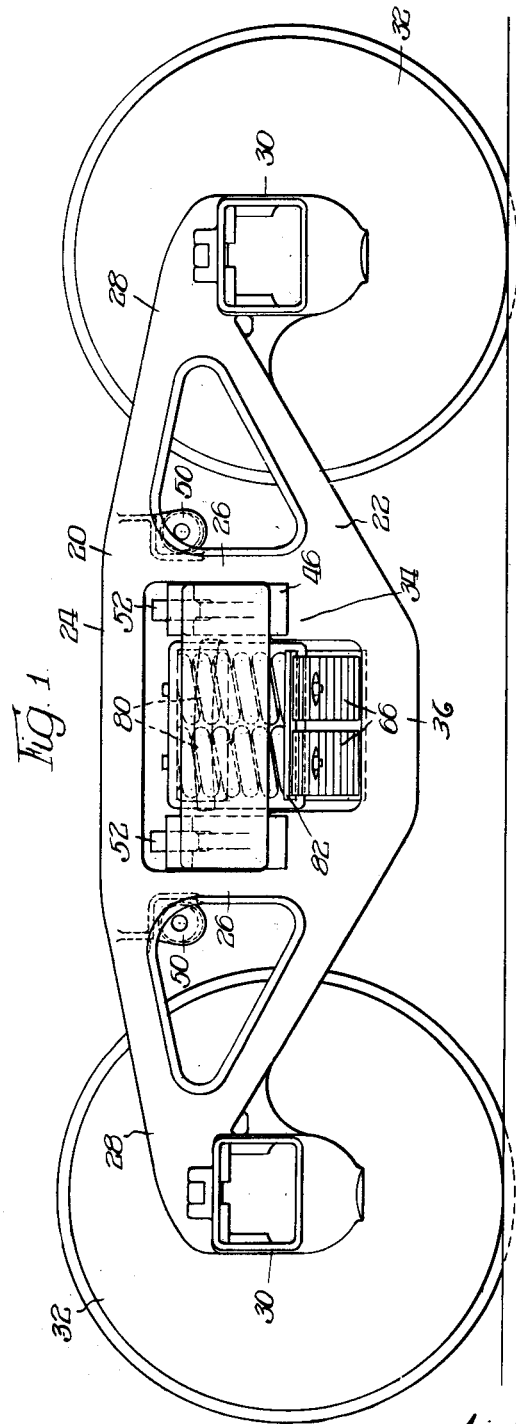
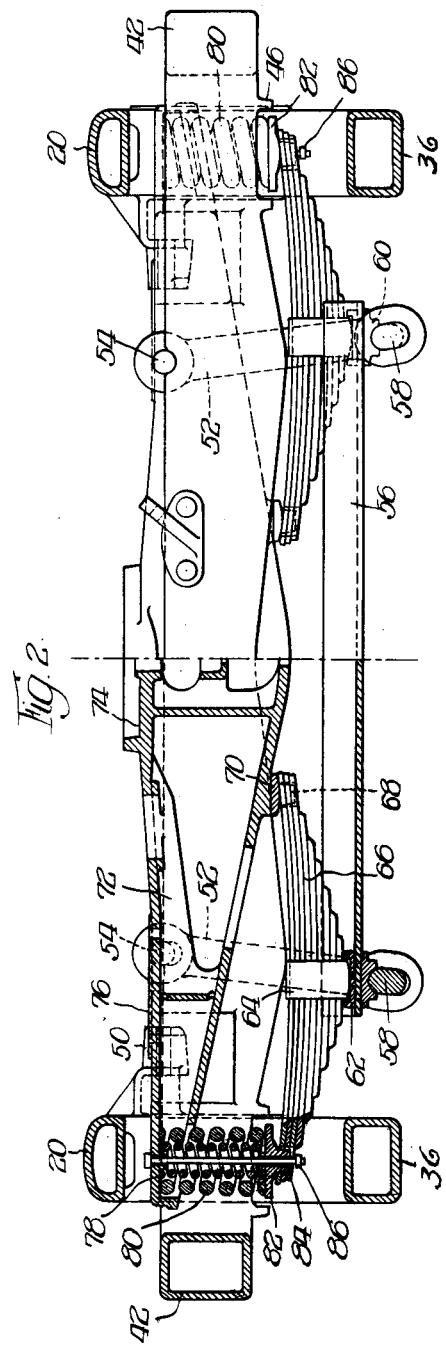
Inventor:
William C. Hedgcock,
By Wilkinson, Huxley, Byron & Knight
attys.

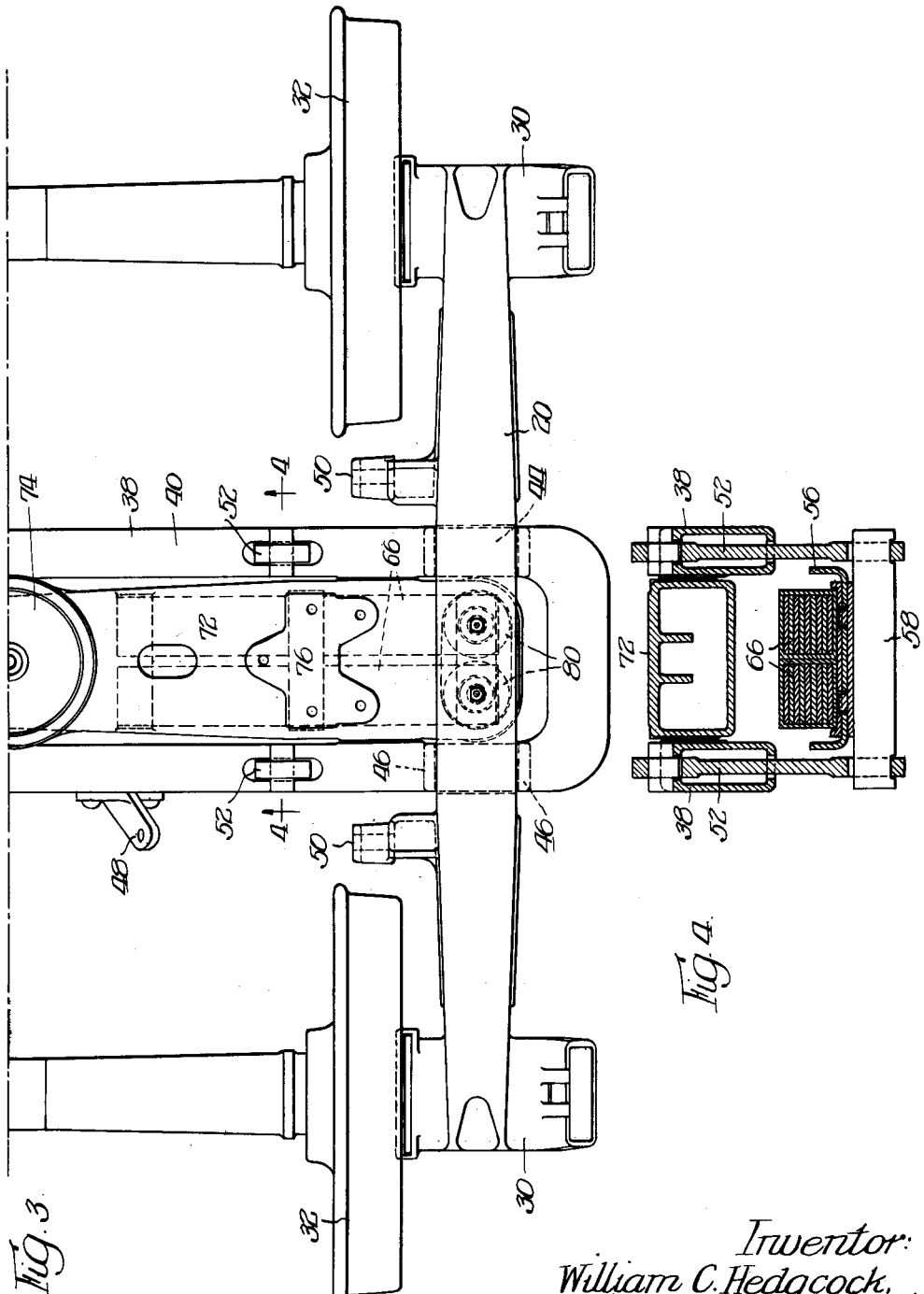

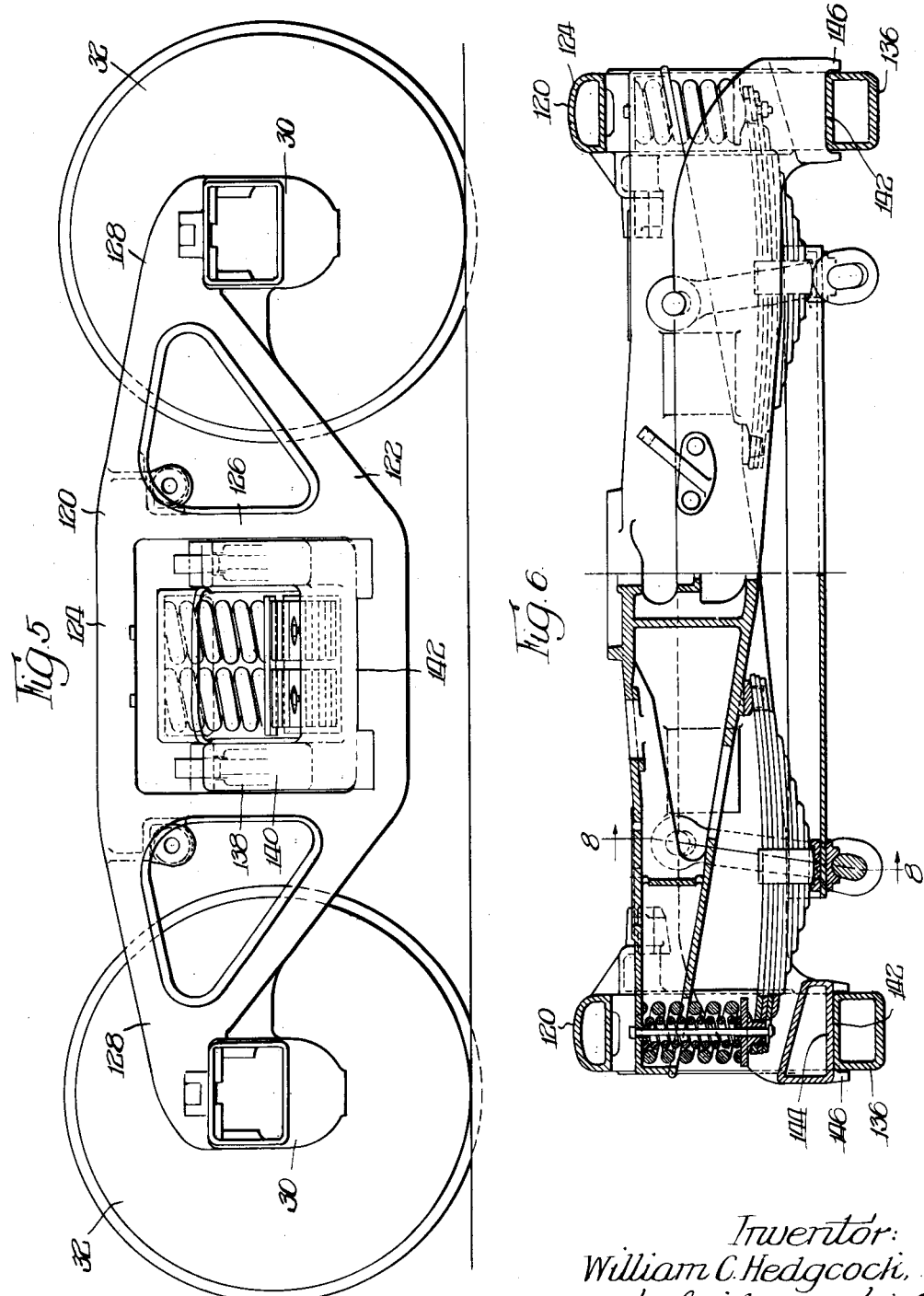

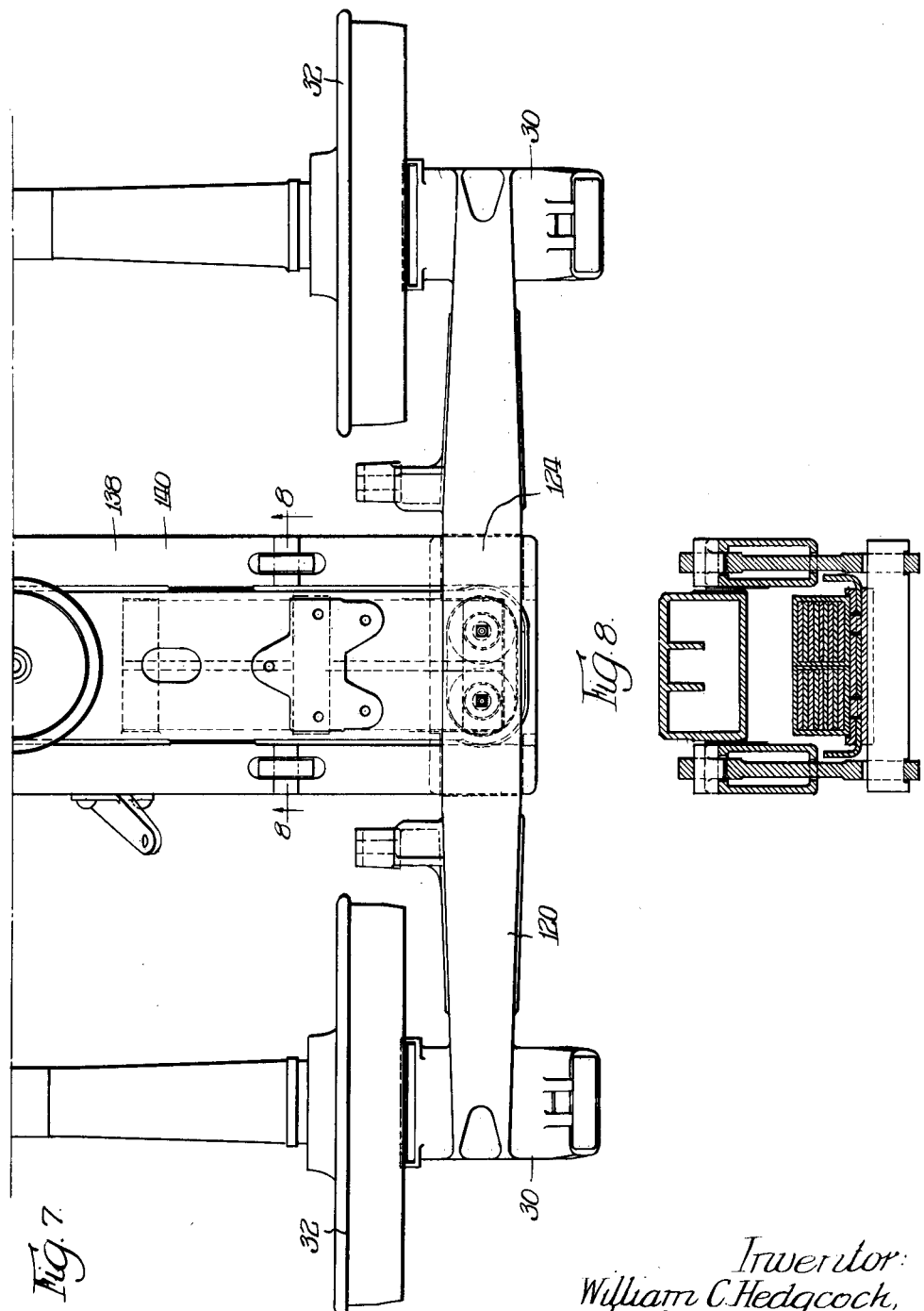

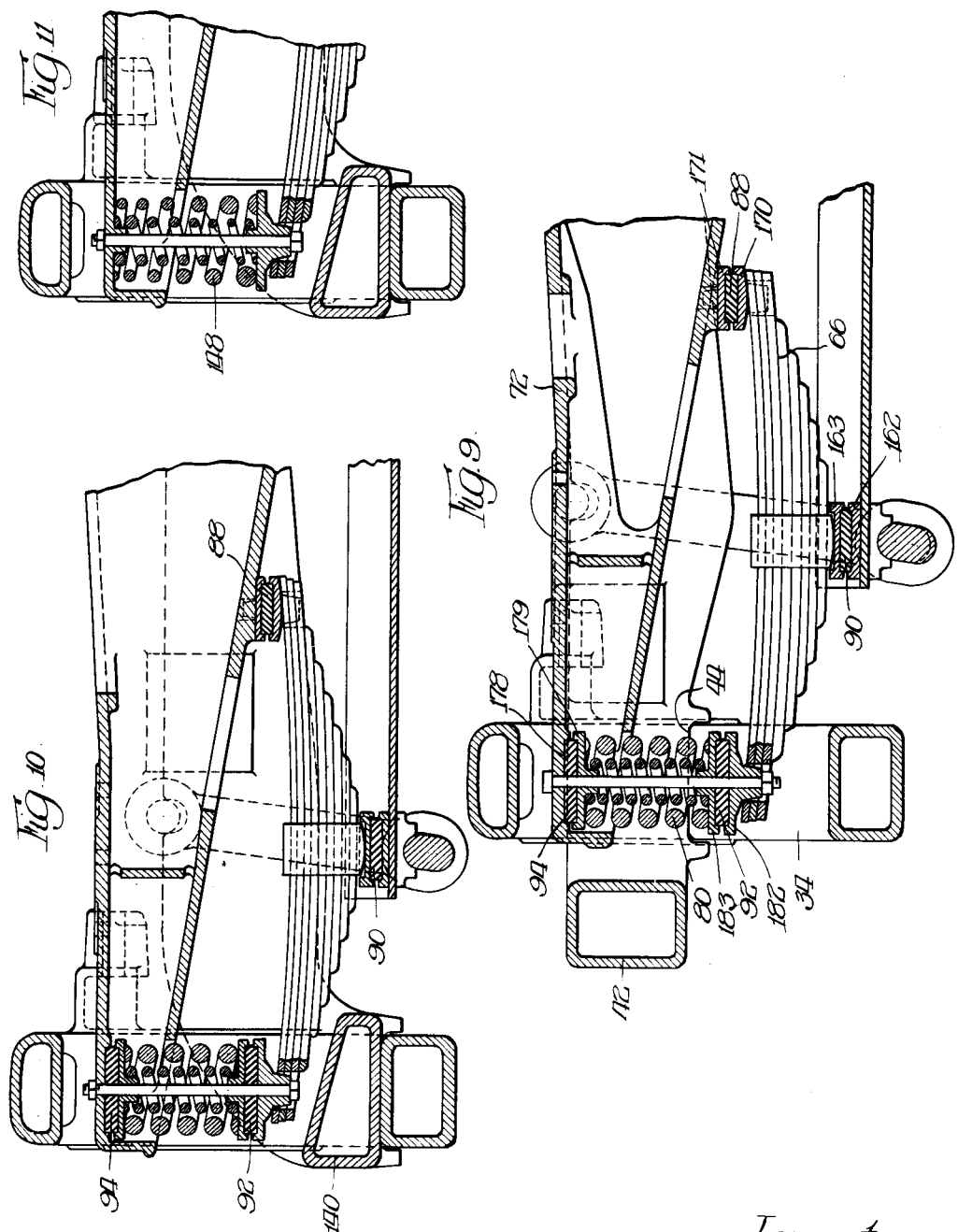

Patented June 27, 1933

1,916,151

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed October 5, 1931. Serial No. 566,877.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough, and if sufficient friction is obtained the spring action becomes too stiff and lacks sensitivity.

Passenger car trucks are generally easy riding, due to the use of both coil and elliptic leaf springs in series; the coil springs responding to the light quick shocks, the leaf springs to the slow, heavy impulses. Coil springs are quick and sensitive, leaf springs relatively less so, in response. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

A passenger car truck also contributes to easy riding by having the bolster suspended on inclined swing hangers for lateral motion to soften lateral shocks.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series without complete duplication of carrying capacity in each kind.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

Yet another object is to provide a car truck having a simple and economical lateral motion bolster construction with inclined swing hangers.

A yet further object is to provide a truck construction wherein resilient pads are provided for dampening out metallic vibrations transmitted through the metallic truck parts, and also for the purpose of deadening noise.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation of a truck construction embodying the invention;

Figure 2 is a transverse fragmentary sectional elevation taken substantially on the transverse center line of the truck construction shown in Figure 1;

Figure 3 is a fragmentary top plan view of the truck construction shown in Figures 1 and 2;

Figure 4 is a longitudinal sectional elevation taken substantially in the plane as indicated by the line 4—4 of Figure 3;

Figure 5 is a side elevation of a modified form of a truck construction embodying the invention;

Figure 6 is a transverse fragmentary sectional elevation taken substantially on the transverse center line of the truck construction shown in Figure 5;

Figure 7 is a fragmentary top plan view of the truck construction shown in Figures 5 and 6;

Figure 8 is a longitudinal sectional elevation taken substantially in the plane as indicated by the line 8—8 of Figure 7;

Figure 9 is an enlarged transverse fragmentary sectional elevation through a truck construction similar to that illustrated in Figures 1 to 4 inclusive showing another modification;

Figure 10 is an enlarged transverse fragmentary sectional elevation through a truck construction similar to that illustrated in Figures 5 to 8 inclusive showing another modification;

Figure 11 is an enlarged fragmentary sectional elevation of a truck construction such as illustrated in Figures 5 to 8 inclusive showing a modified form of spring arrangement, it being understood that this spring arrangement applies equally well to the constructions illustrated in Figures 1 to 4 inclusive and 9.

Referring first of all more particularly to the truck constructions illustrated in Figures 1 to 4 inclusive, and 9, the side frame 20 is preferably of truss construction, including the tension member 22 and the compression member 24 integrally connected by spaced columns 26 forming a window or opening in said frame. The tension and compression members converge adjacent their ends as at 28 and are provided with the journal boxes 30 shown as of the standard A. R. A. construction, though they may be of any preferable construction. The journal boxes have cooperative relation with the journal ends of the wheel and axle assemblies 32, which also may be of any preferable construction.

The side frames are provided between the columns with spaced supporting portions 34 which are disposed above the lower arch bar portion 36 of the tension member. The spaced side frames are connected by the transom 38 the transom including the spaced members 40 integrally connected adjacent their ends by means of the end connecting members 42. The transoms are provided with the seat portions 44 adapted to engage the spaced supports 34, spaced depending lugs 46 being disposed to define the seat portion and to embrace the supports 34 whereby the side frames are maintained in squared relation to the wheel and axle assemblies and to each other. The transom and side frames may be provided with the brake hanger brackets 48 and 50 suitably disposed with respect to the wheel and axle assemblies.

Inclined swing hanger links 52 are fulcrumed as at 54 to the spaced members 40 of the transom and serve to swingably support the spring plank 56, the hanger links being provided with the transverse connecting bar or cross key 58 received in the seat 60 provided on the spring plank. The spring plank is also provided at each end with the seat 62 adapted to receive the spring band 64 and the semi-elliptic springs 66 which are rockably mounted on the seat 62. The inner ends of the semi-elliptic springs are apertured for receiving the positioning dowel 68 of the spring seat 70 provided on the bolster 72. The bolster 72 is provided with the center bearings 74 and the side bearings 76, each end of the bolster extending into the window of the side frame, and being provided with a spring seat 78 for the coil spring assembly 80.

The coil spring assembly 80 is seated on the spring seat 82, said seat being provided with the positioning dowel 84 received in a suitable aperture in the outer end of the leaf spring assembly 66, the entire assembly being provided with the bolt 86 extending through the spring seats 82 and 78 for facilitating assembly of the spring members and associated seats.

In the construction shown in Figure 9 rubber or other resilient pads 88 are interposed between the spring seats 170 and 171 disposed between the inner end of the leaf spring and the bolster. Rubber pads 90 are interposed between the seats 162 and 163 disposed between the spring plank and the leaf spring assembly, and rubber pads 92 are disposed between spring seat members 182 and 183 disposed between the coil spring assembly and the outer end of the leaf spring assembly 66. A resilient pad 94 is also interposed between the seat members 178 and 179 disposed between the bolster 72 and the coil spring assembly 80 and if desired, a resilient pad may also be interposed between the support member 34 and the seat member 44 of the side frame and transom respectively.

In the constructions shown in Figures 5 to 8 inclusive and 10 and 11, the side frame 120 is provided with the tension member 122 and compression member 124, said members being integrally connected by spaced column guides 126 forming an opening or window in the side frame. The tension and compression members converge adjacent their ends as at 128 and are provided with the journal boxes 30 of any preferable construction cooperating with the journal ends of the wheel and axle assemblies 32, also of any preferable construction. In this construction the transom 138 is provided with the spaced members 140 which extend downwardly adjacent their ends and are connected by means of the transverse member 142. The members 142 and the outer ends of the members 140 are provided with a seat portion 144 carried by the lower arch bar 136 of the tension member, the transom being provided with the depending lugs 146 embracing said arch bar.

As before, inclined swing hanger links 52 are fulcrumed as at 54 to the spaced members of the transom and serve to swingably support the spring plank 56, the hanger links being provided with the transverse connecting bar or cross key 58 received in the seat 60 provided on the spring plank. The spring plank is also provided at each end with the seat 62 adapted to receive the spring band 64 and the semi-elliptic springs 66 which are rockably mounted on the seat 62. The inner ends of the semi-elliptic springs are apertured for receiving the positioning dowel 68 of the spring seat 70 provided on the bolster 72. The bolster 72 is provided with the center bearings 74 and the side bearings 76, and each end of the bolster extends into the window of the side frame, being provided with a spring seat 78 for the coil spring assembly 80. The coil spring assembly 80 is seated on the spring seat 82, said seat being provided with the positioning dowel 84 received in a suitable aperture in the outer end of the leaf spring assembly 66, the entire assembly being provided with the bolt 86 extending through the spring seats 82 and 78 for facilitating assembly of the spring members and associated seats.

In the construction shown in Figure 10, resilient pads are shown interposed between various parts of the modification illustrated in Figures 5 and 6, though it will be understood that the same are equally applicable to the other constructions such as shown and described in Figure 9. The resilient pads 92, 94, 90 and 88 are applied as already described with respect to Figure 9, the only difference in the constructions being the disposition of the transom 140.

In the construction shown in Figure 11, instead of using a coil spring assembly such as illustrated at 80 in Figure 2, wherein a spring of constant sectional area and constant pitch is provided, a spring assembly 148 is provided constructed from a bar of tapering diameter. It will of course be understood that a spring of variable pitch or other spring of variable stiffness may be used in any of the modifications shown herein, such springs being the subject matter of application Serial No. 552,153, filed July 21, 1931.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

What is claimed is—

1. In a car truck, the combination of a side frame including tension and compression members and spaced column guides integrally joining said tension and compression members and forming an opening, a transom extending into and seated in said opening, said transom including spaced members, a spring plank, lateral motion means connecting said spring plank and spaced members, a bolster disposed between said spaced members, and a semi-elliptic leaf spring disposed on said spring plank and supporting said bolster at a plurality of points one of said points being through a coil spring.

2. In a car truck, the combination of a side frame including tension and compression members and spaced column guides integrally joining said tension and compression members and forming an opening, a transom extending into and seated in said opening, said transom including spaced members, a spring plank, links connecting said spring plank and spaced members, a bolster disposed between said spaced members, and a leaf spring disposed on said spring plank and supporting said bolster at a plurality of points one of said points being through a coil spring.

3. In a car truck, the combination of a side frame including tension and compression members and spaced column guides integrally joining said tension and compression members and forming an opening, a transom extending into and seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point through a coil spring, said coil spring being disposed outwardly of said non-resilient point.

4. In a car truck, the combination of a side frame including tension and compression members and spaced column guides integrally joining said tension and compression members and forming an opening, a transom extending into and seated in said opening, said transom including spaced members, a spring plank, links connecting said spring plank and spaced members, a bolster disposed between said spaced members, and a leaf spring disposed on said spring plank and supporting said bolster at a plurality of points, said spring being non-resiliently connected to said bolster at one point and resiliently connected thereto at another point through a metallic spring.

5. In a car truck, the combination of a side frame including tension and compression members and spaced column guides integrally joining said tension and compression members and forming an opening, a transom extending into and seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring.

6. In a car truck, the combination of a side frame including tension and compression members and spaced column guides integrally joining said tension and compression members and forming an opening, a transom extending into and seated in said opening, said transom including spaced members, a spring plank, links connecting said spring plank and spaced members, a bolster disposed between said spaced members, and a leaf spring disposed on said spring plank and supporting said bolster at a plurality of points, said spring being non-resiliently connected to said bolster at one point and resiliently connected thereto at another point, the resilient connection being through a coil spring outwardly of the non-resilient connection thereto.

7. In a car truck, the combination of a side frame including tension and compression members and spaced column guides integrally joining said tension and compression members and forming an opening, a transom extending into said opening and non-resiliently engaging said side frame, said transom including spaced members, a spring plank, links connecting said spring plank and spaced members, a bolster disposed between said spaced members, and a semi-elliptic leaf spring disposed on said spring plank and supporting said bolster at a plurality of points one of said points being through a coil spring.

8. In a car truck, the combination of a side frame including tension and compression members and spaced column guides integrally joining said tension and compression members and forming an opening, a transom extending into said opening and non-resiliently engaging said side frame, said transom including spaced members, a spring plank, links connecting said spring plank and spaced members, a bolster disposed between said spaced members, and a leaf spring disposed on said spring plank and supporting said bolster at a plurality of points one of said points being through a coil spring.

9. In a car truck, the combination of a side frame including tension and compression members and spaced column guides integrally joining said tension and compression members and forming an opening, a transom extending into said opening and non-resiliently engaging said side frame, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point through a metallic spring.

10. In a car truck, the combination of a side frame including tension and compression members and spaced column guides integrally joining said tension and compression members and forming an opening, a transom extending into said opening and non-resiliently engaging said side frame, said transom including spaced members, a spring plank, links connecting said spring plank and spaced members, a bolster disposed between said spaced members, and a leaf spring disposed on said spring plank and supporting said bolster at a plurality of points, said spring being non-resiliently connected to said bolster at one point and resiliently connected thereto at another point through a metallic spring.

11. In a car truck, the combination of a side frame including tension and compression members and spaced column guides integrally joining said tension and compression members and forming an opening, a transom extending into and non-resiliently seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring and being the outer of the points of support of said bolster.

12. In a car truck, the combination of a side frame including tension and compression members and spaced column guides integrally joining said tension and compression members and forming an opening, a transom extending into and non-resiliently seated in said opening, said transom including spaced members, a spring plank, links connecting said spring plank and spaced members, a bolster disposed between said spaced members, and a leaf spring disposed on said spring plank and supporting said bolster at a plurality of points, said spring being non-resiliently connected to said bolster at one point and resiliently connected thereto at another point, the resilient connection being through a coil spring and being the outer of the points of support of said bolster.

13. In a car truck, the combination of a side frame including tension and compression members and spaced column guides integrally joining said tension and compression members and forming an opening, a transom extending into and seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring of variable stiffness.

14. In a car truck, the combination of a side frame including tension and compression members and spaced column guides integrally joining said tension and compression members and forming an opening, a transom extending into and seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring of variable pitch.

15. In a car truck, the combination of a side frame including tension and compression members and spaced column guides integrally joining said tension and compression members and forming an opening, a transom extending into and seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring of variable section.

16. In a car truck, the combination of a side frame including tension and compression members and spaced column guides integrally joining said tension and compression members and forming an opening, a transom extending into and seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring of constant section.

17. In a car truck, the combination of a side frame including tension and compression members and spaced column guides integrally joining said tension and compression members and forming an opening, a transom extending into and non-resiliently seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring of variable stiffness.

18. In a car truck, the combination of a side frame including tension and compression members and spaced column guides integrally joining said tension and compression members and forming an opening, a transom extending into and non-resiliently seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring of variable pitch.

19. In a car truck, the combination of a side frame including tension and compression members and spaced column guides integrally joining said tension and compression members and forming an opening, a transom extending into and non-resiliently seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring of variable section.

20. In a car truck, the combination of a side frame including tension and compression members and spaced column guides integrally joining said tension and compression members and forming an opening, a transom extending into and non-resiliently seated in said opening, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring of constant section.

21. In a car truck the combination of a side frame, a transom supported thereon, said transom including spaced members, a spring plank, links connecting said spring plank and spaced members, a bolster disposed between said spaced members, and a semi-elliptic leaf spring disposed on said spring plank and supporting said bolster at a plurality of points, one of said points being through a metallic spring.

22. In a car truck the combination of a side frame, a transom non-resiliently supported thereon by engagement therewith, said transom including spaced members, a spring plank, links connecting said spring plank and spaced members, a bolster disposed between said spaced members, and a semi-elliptic leaf spring disposed on said spring plank and supporting said bolster at a plurality of points, one of said points being through a metallic spring.

23. In a car truck the combination of a side frame, a transom supported thereon by engagement therewith, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point through a metallic spring.

24. In a car truck the combination of a side frame, a transom non-resiliently supported thereon by engagement therewith, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point through a metallic spring.

25. In a car truck the combination of a side frame, a transom supported thereon, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring.

26. In a car truck the combination of a side frame, a transom non-resiliently supported thereon, said transom including spaced members, a spring plank, links connecting said spring plank and spaced members, a bolster disposed between said spaced members, and a semi-elliptic leaf spring disposed on said spring plank and supporting said bolster at a plurality of points, said spring being non-resiliently connected to said bolster at one point and resiliently connected thereto at another point, the resilient connection being through a coil spring.

27. In a truck, the combination with separate side frames having central openings; of a transom having its ends detachably received in said openings and resting upon the lower side frame member in said openings, a bolster swingingly suspended from said transom for motion in a direction transversely of said truck and springs of different character in series interposed between said transom and bolster and each engaging said bolster.

28. In a truck, the combination with separate side frames having central openings; of a transom having its ends detachably received in said openings and resting upon the lower side frame member in said openings, a bolster swingingly suspended from said transom for motion in a direction transversely of said truck and leaf and coil springs in series interposed between said transom and bolster and each engaging said bolster.

29. In a truck, the combination with the side frames having central openings; of a cast transom having the ends thereof received in said center openings of the side frames, the ends of said transom each having a center opening; a spring plank suspended from said transom, a bolster, and coil and semi-elliptic springs in series interposed between said plank and bolster, each engaging said bolster.

30. In a truck, the combination with the side frames, the latter having upper and lower bars and spaced columns therebetween; said columns having offset portions, a transom having portions non-resiliently seated on said offset portions, and a bolster swingingly and resiliently supported by said transom through means including springs in series, each of the springs engaging said bolster.

31. In a truck, the combination with the side frames, the latter having upper and lower bars and spaced columns therebetween; said columns having offset portions, a transom having portions non-resiliently seated on said offset portions, and a bolster swingingly and resiliently supported by said transom through means including springs of leaf and coil type disposed in series, each of the springs engaging said bolster.

32. In a truck, the combination with the side frames, the latter having upper and lower bars and spaced columns therebetween: said columns having offset portions, a transom having portions non-resiliently seated on said offset portions, and a bolster swingingly and resiliently supported by said transom through means including springs of semi-elliptic and coil type disposed in series, each of the springs engaging said bolster.

33. In a truck, the combination with separate side frames having central openings; of a transom having end sections depending below the plane of the body of the transom, the end sections being received in the openings in said side frames, spring means supported by said transom below the intermediate portion of the same, and a bolster supported by said springs, said spring means including springs of different character disposed in series, each engaging said bolster.

34. In a truck, the combination of side frames having openings therethrough, a transom having its ends extended through said openings and rigidly supported within said openings by the side frames, a bolster, and leaf and coil springs disposed in series suspended from and lying below said transom and underlying and supporting said bolster, each engaging said bolster.

35. In a truck, the combination of side frames having openings therethrough, a transom having its ends extended through said openings and rigidly supported within said openings by the side frames, a bolster and resilient means suspended from and lying below said transom and underlying and supporting said bolster, said resilient means including a coil spring and a metallic spring in series therewith, each engaging said bolster.

36. In a truck, the combination of side frames having openings therethrough, a transom having its ends extended through said openings and rigidly supported within said openings by the side frames, a bolster and resilient means suspended from and lying below said transom and underlying and supporting said bolster, said resilient means including a coil spring and another resilient member disposed in series with said coil spring, each engaging said bolster.

37. In a truck, the combination of side frames having openings therethrough, a transom having its ends extended through said openings and rigidly supported within said openings by the lower arch bars of the side frames, a bolster, and leaf and coil springs in series suspended from and lying below said transom and underlying and supporting said bolster and each engaging said bolster.

38. In a truck, the combination of side frames having openings therethrough, a transom having its ends extended through said openings and supported within said openings by the lower arch bars of the side frames, a bolster and leaf and coil springs in series suspended from and lying below said transom and underlying and supporting said bolster, each of said leaf springs extending outwardly into the opening in the proximate side frame, said leaf and coil springs engaging said bolster.

39. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points, and a coil spring of variable stiffness interposed between said leaf spring and said bolster.

40. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points and a coil spring of variable stiffness interposed between one end of said leaf spring and said bolster.

41. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points and a coil spring of variable pitch interposed between said leaf spring and said bolster.

42. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points and a coil spring of variable sectional diameter interposed between said leaf spring and said bolster.

43. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points, a coil spring of variable stiffness interposed between said leaf spring and said bolster, and a resilient pad disposed between one of said springs and the truck structure.

44. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points, a coil spring of variable stiffness interposed between one end of said leaf spring and said bolster and a resilient pad disposed between one of said springs and the truck structure.

45. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points and a coil spring of variable pitch interposed between said leaf spring and said bolster, and a resilient pad disposed between one of said springs and the truck structure.

46. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points, a coil spring of variable sectional diameter interposed between said leaf spring and said bolster and a resilient pad disposed between one of said springs and the truck structure.

47. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points, a coil spring of variable stiffness interposed between said leaf spring and said bolster and a resilient pad disposed between one of said springs and the truck structure and between said transom and side frame.

48. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points, a coil spring of variable stiffness interposed between one end of said leaf spring and said bolster and a resilient pad disposed between one of said springs and the truck structure and between said transom and side frame.

49. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points, and a coil spring of variable pitch interposed between said leaf spring and said bolster, and a resilient pad disposed between one of said springs and the truck structure and between said transom and side frame.

50. In a car truck the combination of a side frame, a transom supported thereon, said transom including spaced members, a spring plank, links connecting said spring plank and spaced members, a bolster disposed between said spaced members, a semi-elliptic leaf spring disposed on said spring plank and supporting said bolster at a plurality of points, a coil spring of variable sectional diameter interposed between said leaf spring and said bolster and a resilient pad disposed between one of said springs and the truck structure and between said transom and side frame.

51. In a car truck the combination of a side frame including tension and compression members and spaced column guides integrally joining said tension and compression members and forming an opening, a transom extending into and seated in said opening on the lower arch bar of said side frame, said transom including spaced members, a spring plank, links connecting said spring plank and spaced members, a bolster disposed between said spaced members and a semi-elliptic leaf spring disposed on said spring plank and supporting said bolster at a plurality of points one of said points being through a metallic spring.

52. In a car truck the combination of a side frame including tension and compression members and spaced column guides integrally joining said tension and compression members and forming an opening, a transom extending into and seated in said opening on a support above the lower arch bar of said side frame, said transom including spaced members, a spring plank, links connecting said spring plank and spaced members, a bolster disposed between said spaced members and a semi-elliptic leaf spring disposed on said spring plank and supporting said bolster at a plurality of points one of said points being through a metallic spring.

Signed at Chicago, Illinois, this 22nd day of September, 1931.

WILLIAM C. HEDGCOCK.